April 15, 1941.  E. K. CLARK  2,238,624

OFF-PEAK WATER HEATER CONTROL

Filed Jan. 12, 1939  5 Sheets-Sheet 1

WITNESSES:

INVENTOR
Earl K. Clark.
BY
ATTORNEY

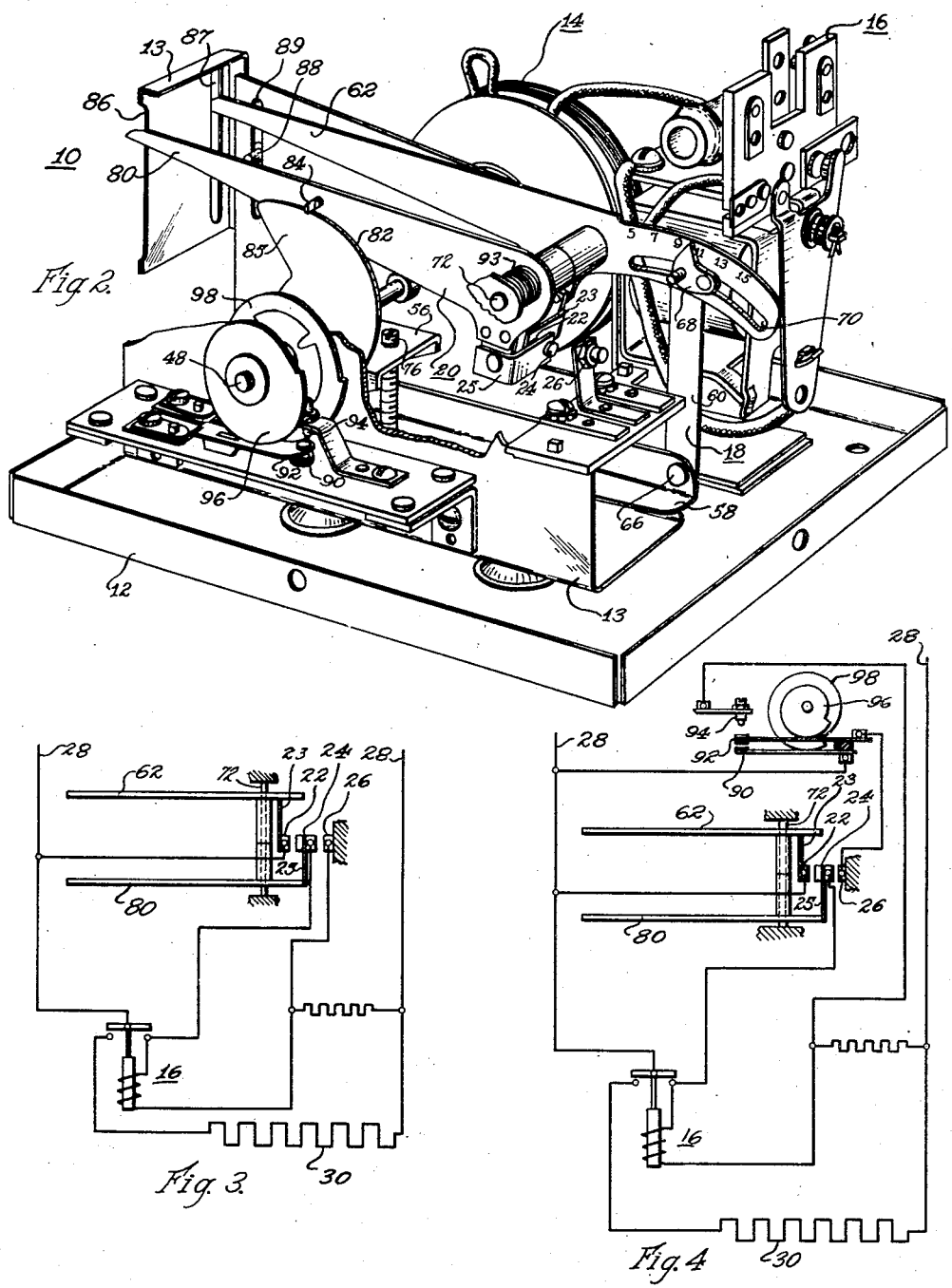

April 15, 1941.  E. K. CLARK  2,238,624

OFF-PEAK WATER HEATER CONTROL

Filed Jan. 12, 1939  5 Sheets-Sheet 3

WITNESSES:  INVENTOR
  Earl K. Clark.
  BY
  ATTORNEY

April 15, 1941. E. K. CLARK 2,238,624
OFF-PEAK WATER HEATER CONTROL
Filed Jan. 12, 1939 5 Sheets-Sheet 4
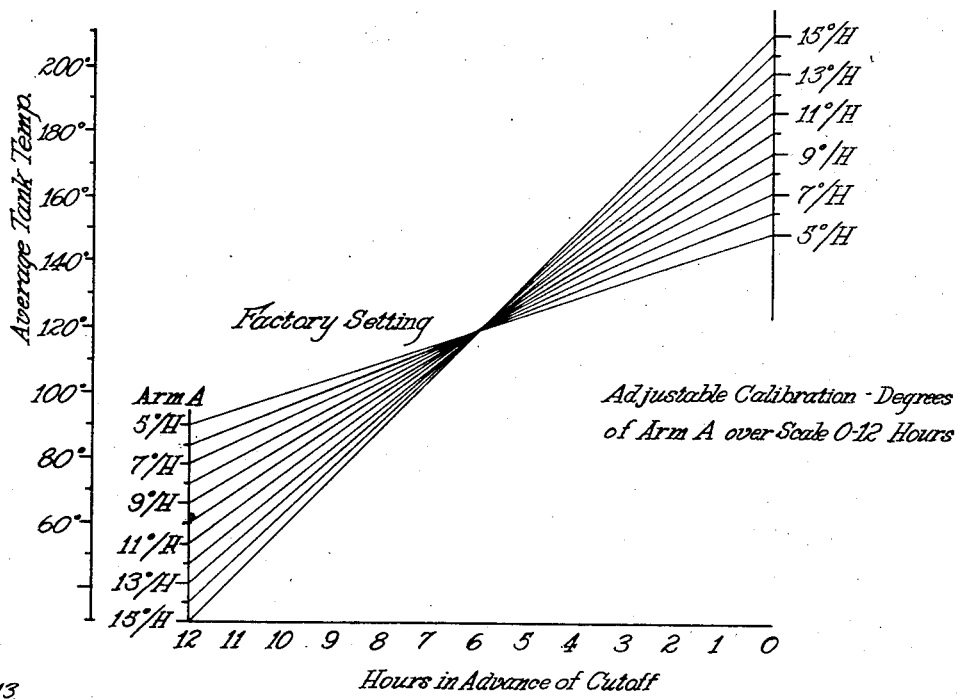
Fig. 7
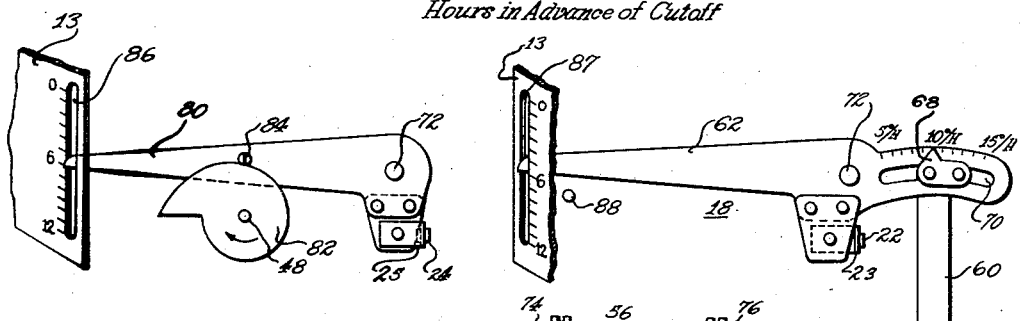
Fig. 8. Fig. 9.
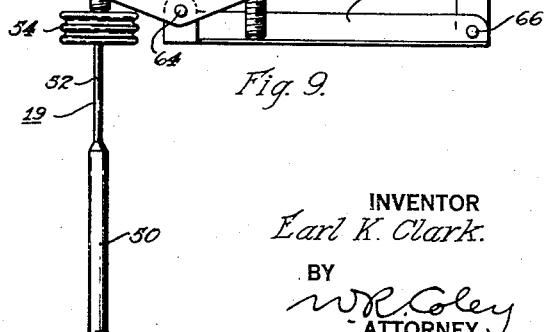
WITNESSES:
INVENTOR
Earl K. Clark.
BY
ATTORNEY

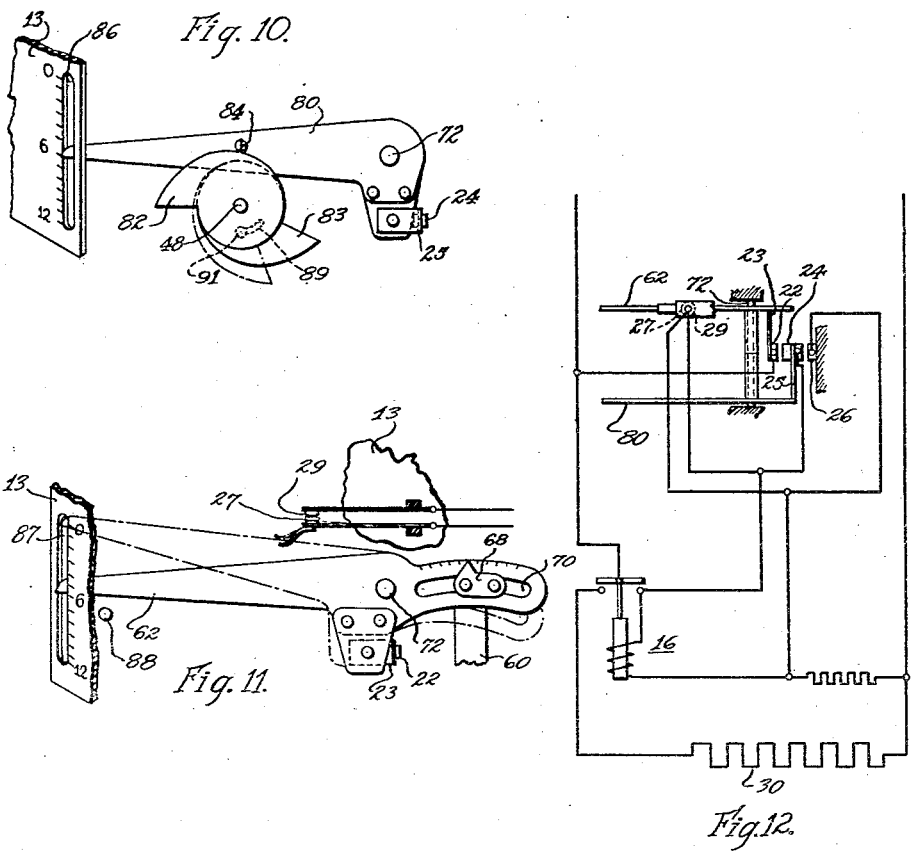

Patented Apr. 15, 1941

2,238,624

UNITED STATES PATENT OFFICE 2,238,624

OFF-PEAK WATER HEATER CONTROL

Earl K. Clark, Mansfield, Ohio, assignor to Westinghouse Electric & Manufacturing Company, East Pittsburgh, Pa., a corporation of Pennsylvania Application January 12, 1939, Serial No. 250,559

8 Claims. (Cl. 219—39)

My invention relates to control systems for heating devices, and more particularly, to control systems for regulating the off-peak operation of a water heater or the like.

An object of my invention is to provide a practical, rugged, efficient, inexpensive, off-peak water heater controlling device which will connect the water heater to a suitable power supply at just the proper time, whereby the water thereof will reach the desired temperature at the end of a predetermined off-peak period.

A further object of my invention is to provide an off-peak water heater controlling device which will connect the water heater to the power supply in accordance with the water heater heating requirements, so that the heating thereof will take place during the last hours of the off peak period instead of during the first hours of such off peak period, as is done in the conventional systems now known to the art.

A further object of my invention is to provide an off-peak water heater controlling device having an adjustable-rate thermostat operatively associated with the water heating tank, which will permit various rates of heating from, say, 5° per hour to 15° per hour.

Other objects of my invention will either be pointed out specifically in the course of the following description of a device embodying my invention, or will be apparent from such description.

In the accompanying drawings,

Fig. 2 is a perspective view of the off-peak water heater controlling device embodying my invention with portions thereof broken away;

Fig. 3 is a schematic wiring diagram of a portion of the off-peak water heater controlling device shown in Fig. 2;

Fig. 4 is a schematic wiring diagram of the complete water heater controlling device shown in Fig. 3;

Fig. 7 is a graph showing the relation of the hours in advance of cutoff to average tank temperature in degrees Fahrenheit for a plurality of adjustable rates of heating and at a factory temperature setting of the off-peak controlling device;

Figs. 8 and 9 are schematic mechanical drawings of portions of the controlling device embodying my invention;

Fig. 10 is a schematic drawing similar to Fig. 8 illustrating the use of two cams;

Fig. 11 is a schematic drawing showing a portion of the structure of Fig. 9 in conjunction with additional cooperating contact members to provide a certain safety feature;

Fig. 12 is a schematic diagram similar to Fig. 3; and

Fig. 13 is a plan view of an involute cam used in the device embodying my invention.

Figure 1:
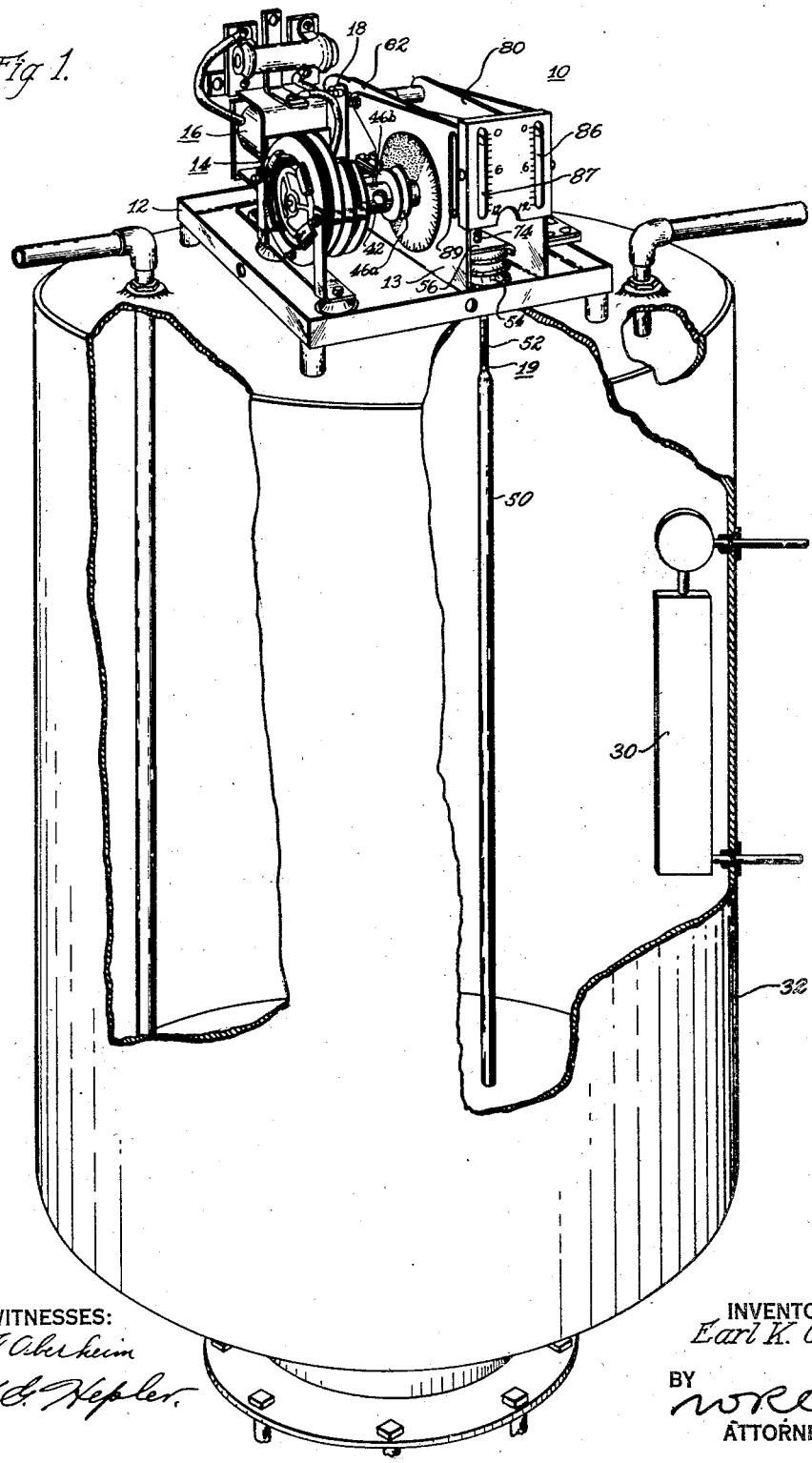
Figure 1 is a fragmentary perspective view of an off-peak water heater controlling device embodying my invention incorporated with a water heater tank.

Referring to the accompanying drawings, I show an off-peak water heater controlling device 10 including a suitable supporting structure 12 therefor, a time-of-day or clock mechanism 14, a suitable relay 16, an adjustable-rate thermostat 18, an elapsed-time device 20 operatively associated with the time-of-day mechanism 14, and a plurality of contacts 22, 24 and 26 which are operatively associated with the adjustable-rate thermostat 18, elapsed-time device 20 and a power supply 28, respectively. The power supply 28 through contacts 22, 24 and 26 operates the relay 16, which in turn connects the heater 30 located within the fluid tank 32 to the power supply 28.

Generally, as hereinafter described in greater detail and as shown in the accompanying drawings, the arm 62 of the adjustable-rate thermostat 18 rotates in response to the average changes in temperature of the water in the tank 32. This rotation is clockwise with an increase in water temperature in direct relation to the rate of heating of the water and counter-clockwise with a decrease in water temperature. The arm 80 of the elapsed-time device 20 likewise rotates, in this instance, clockwise with the passage of time. However, arm 80 rotates in direct relation to the passage of time in response to the movements of cam 82 which is operatively associated with and responsive to the movements of the time-of-day mechanism 14. When arms 62 and 80 arrive at substantially the same plane, the contacts 22 and 24, respectively, become engaged and the heater 30 will be connected to the power supply.

This cooperative engagement of contacts 22 and 24 will occur just soon enough to establish the desired maximum water temperature at the end of the off-peak period. With the speed of rotation of the thermostat arm 62 set to correspond to its particular tank's heating rate in degrees per hour, the arm will rotate substantially in unison with the time arm 80. The relay 16, being of the self-holding type, and actuated by means of the engagement of contacts 22 and 24 will then remain engaged with the passage of time during the heating portion of the off-peak period. The heating portion may include the entire off-peak period, or any smaller amount.

The time arm 80 will continue its progressive rotation until cam 82 arrives at the end of the off-peak period. The cam 82 will then cause the arm 80 to drop, ensuring disengagement of the contacts 22 and 24 and engagement of contacts 24 and 26. The water heater will then be disconnected from the power supply at the end of the off-peak period with the water temperature at its predetermined maximum value.

More specifically, the time-of-day or clock-like driving mechanism 14 shown in Figs. 1, 2, 5 and 6, includes, in this instance, a suitable constant-speed motor 40 operatively associated with a plurality of gears 42 which, in turn, connect the motor 40 to a driving shaft 44. It is to be understood that any suitable driving mechanism may be used as the time-of-day or clock-like driving mechanism 14 providing such device supplies a substantial constant-speed driving force to the control device. However, it is preferred that such mechanism be electrically operated and be loosely connected to the main heater control mechanism by means of a suitable flexible coupling 46. In this instance, the coupling 46 includes a flanged sleeve 46a rigidly attached to the driving shaft 44 and a driven flange 46b rigidly attached to a driven shaft 48.

The power relay 16 operatively associated with the water heater controlling device, as hereinafter described, may be of any type desired. However, it is preferred that the relay be of such size that it will adequately handle the power needed for any desired type of water heater which has a capacity of say, substantially six kilowatts.

The adjustable-rate thermostat 18 includes a tank-average temperature-responsive device 19, an adjusting lever 56, a lower intermediate lever 58, a link 60 and the main thermostat arm 62. The temperature-responsive device 19 comprises an actuating bulb 50, a capillary tube 52, and a bellows 54. The actuating bulb 50 is, in this instance, substantially as long as the height of the tank 32, whereby the fluid within the bulb 50 will expand in proportion to the average temperature of the water within the tank. The expansion and contraction of the fluid within bulb 50 is transmitted to the bellows 54 by means of the capillary tube 52. With the bellows 54 responsive to the average temperature of the tank 32, it follows that the action of the thermostat 18 will be responsive to the average temperature of the tank.

The adjustable lever 56, which is operatively associated with the bellows 54, by means of one end thereof, and with intermediate lever 58 by means of the other end thereof, is rotatably attached to frame 13 by means of shaft 64. In addition, intermediate lever 58 is also rotatably attached to the frame 13 by means of shaft 64. Link 60 is rotatably attached at its lower end, by means of a suitable rivet or screw 66, to the intermediate lever 58 at an end opposite to that in which the intermediate lever is rotatably mounted on the casing 13. The link 60 is adjustably attached at its upper end to the main arm 62 by means of an adjustable marker 68. The adjustable marker 68 cooperates with an arcuate slot 70 located in the rear portion of main arm 62.

The main thermostat arm 62 is rotatably mounted on shaft 72 intermediate the rear arcuately slotted portion and the front or pointer portion which cooperates with casing 13. It, therefore, follows that should the link 60 and marker 68 be positioned at the front part of the arcuate slot 70, or that part of the arc adjacent or nearest to the shaft 72, the front or pointer portion of the arm 62 will move a greater distance for a given movement of the link 60 and operatively associated intermediate lever 58, than if the link 60 and marker 68 were to be located at the rear portion of the arcuate slot 70. The relative movement of main arm 62 with respect to main lever 58 may thus be readily adjusted. Accordingly, by marking a scale adjacent to the arcuate slot 70, say, as in this instance, in degrees per hour, relative movements of the main arm 62 and the lever 58 may be adjusted to any desired predetermined value, and therefore, the adjustable rate thermostat 18 may be readily adjusted to a predetermined rate from, say, 5° per hour to 15° per hour, as hereinafter described. This ability to adjust the heating rate enables the control to maintain any desired average tank temperature for a given time in advance of the cutoff, as is clearly shown in Fig. 7 which illustrates the relation of the hours in advance of cutoff to the average tank temperature for a plurality of adjustable rates of heating.

Figure 5:
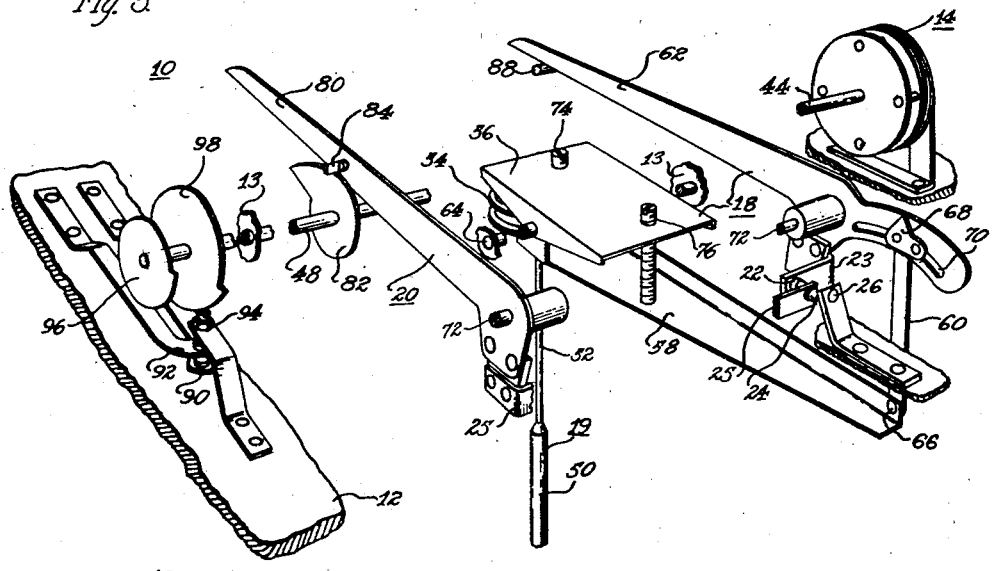
Fig. 5 is an exploded perspective view of portions of the off-peak water heater controlling device shown in their respective positions.

The movements of the bellows 54, which are responsive to the average temperature changes in tank 32 through action of bulb 50, are transmitted to the main lever 58 by means of adjusting screws 74 and 76 and adjusting lever 56, see Figs. 5 and 9. The adjusting screw 76 may be marked in degrees so that the adjustable rate thermostat 18 may be readily adjusted to any desired value by rotating such set screw to the desired setting.

In other words, as the tank is heated, the material in the bulb 50 expands. This material is then forced through capillary tube 52 causing bellows 54 to expand. Inasmuch as screw 74, associated with adjusting lever 56, rests against the bellows 54, such screw 74 will be moved upwardly as the bellows expands. The upward movement of screw 74 will cause adjusting lever 56 to rotate in a clockwise direction. This movement of lever 56 will, through the action of adjusting screw 76, then force the lever 58 to rotate in a clockwise direction and link 60 to be moved downward. The temperature arm 62 will then be rotated in a clockwise direction and contact 22, attached thereto, will be moved away from stationary contact 26. Accordingly, it is obvious that the temperature arm 62 will be moved upwardly or in a clockwise direction with an increase in the average tank temperature.

The elapsed-time device 20 comprises substantially an arm 80 and an involute cam 82. The arm 80 is rotatably mounted upon shaft 72 and has a pin 84 located substantially in the central part of the arm 80. Inasmuch as thermostat arm 62 is also mounted on shaft 72, it follows that arms 62 and 80 are mounted coaxially. The involute cam 82 is rigidly attached to the driven shaft 48 which is operatively associated with the time-of-day mechanism 14 through flexible coupling 46, as hereinabove described. A resilient member 93, see Figs. 2 and 6, rigidly attached to the casing 13 at one end and to the arm 80 at the other end, biases the arm 80 towards the cam 82. However, the pin 84 limits the movement of the arm 80 and, due to the biasing action of resilient member 93, a positive contact therebetween will be maintained. Further, due to cooperative action of pin 84 and cam 82, the movements of arm 80 will be in direct response to the configuration of cam 82. It is, therefore, apparent that the position of the arm 80 will depend upon the angular position of the involute cam 82 which, in turn, through its cooperation with the time-of-day mechanism 14, is a function of the time of day. However, it is apparent that the relative angular position of the involute cam 82 with respect to shaft 48 may be of any value desired.

The free ends of coaxially mounted thermostat arm 62 and time arm 80 extend through slotted apertures 87 and 86, respectively, in casing 13 and function as pointers which indicate the relative position of the respective arms, see Figs. 1, 2, 8 and 9. Similarly marked scales are positioned adjacent to the slots 86 and 87. However, the scale for the time arm 80 indicates hours in advance of cut-off or the termination of the off-peak period, whereas the scale for the thermostat arm 62 indicates the number of hours necessary to heat the water located in the tank up to the desired maximum temperature value. It, therefore, follows that when the arms 62 and 80 are positioned at substantially the same point on their respective scales that the heater 30, located within the tank 32, should be connected to the power supply. This is true, as hereinafter described.

The contacts 22 and 24 are rigidly attached to thermostat arm 62 and time arm 80, respectively, by means of brackets 23 and 25, respectively, in any suitable manner and are mounted in line with each other so as to become engaged in response to the movements of the arms 62 and 80.

Figure 6:
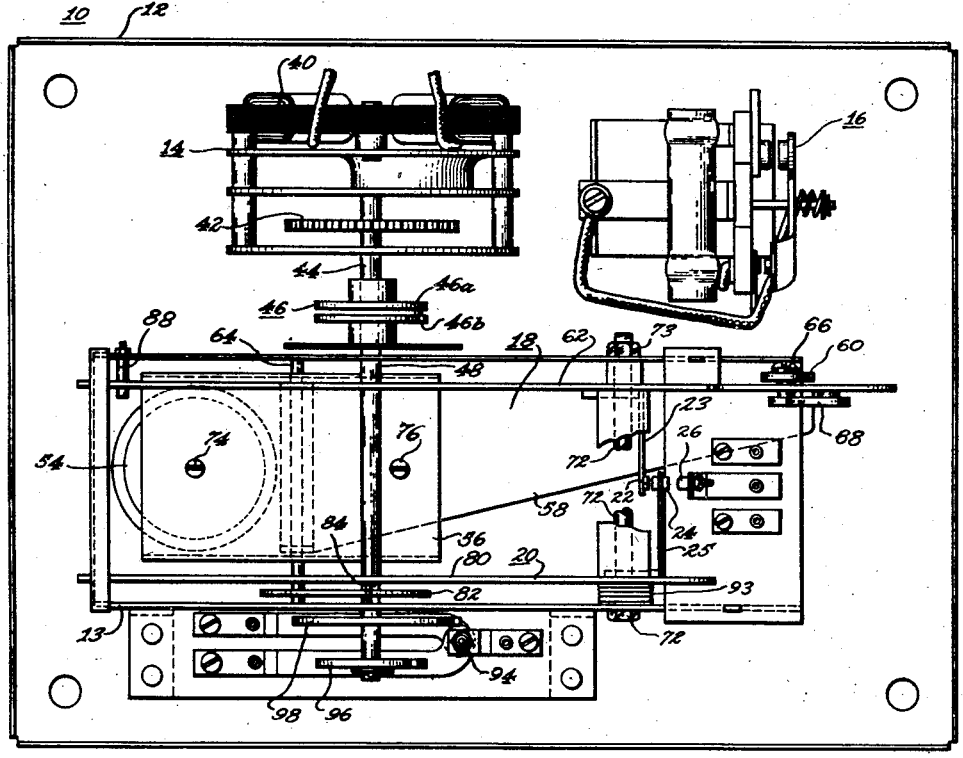
Fig. 6 is a top view of the controlling device shown in Fig. 1.

The contact 22, rigidly attached to the arm 62 of adjustable-rate thermostat 18, see Figs. 5 and 6, is located substantially in line with the contacts 24, rigidly attached to arm 80 of the elapsed-time device 20, and the stationary contact 26. However, the contacts 22, 24 and 26 remain separated, substantially the greater part of the day in accordance with the movements of arms 62 and 80. More specifically thermostat arm 62 is held upwardly in direct relation to the water temperature by the action of the expansive liquid located in the bulb 50 acting upon bellows 54 and link 60, and the time arm 80 is down, with a slow upward or clockwise movement in proportion to the passage of time.

As the water temperature decreases, the action of the bellows 54 permits the thermostat lever 62 to proceed downwardly or counter-clockwise and the contact 22 to be moved towards the contacts 24 and 26. The amount of movement of the contact 22 will depend upon the rate of drop in temperature of the fluid in contact with the bulb 50 and the position of the adjustable marker 68 within arcuate slots 70. Inasmuch as time arm 80 is rotated in a clockwise direction in response to movements of cam 82, the contact 24, operatively associated therewith will likewise rotate in a clockwise direction. In other words, the contact 24 is moved towards contact 22 on the thermostat arm 62 and away from stationary contact 26. The rate of travel of the contact 24 will then be directly proportional to the time of day, having a definite velocity in relation to the passage of time.

Inasmuch as contacts 22 and 24 move towards each other with a lowering tank temperature and the approach of the end of the off-peak period, it is obvious that they will become engaged with the passage of a predetermined interval of time and a lowering of the average tank temperature. When they do become engaged, the thermostat lever 62 will reverse its direction of rotation primarily due to the increase in temperature of the water as the heater is connected to the power supply, and when properly calibrated will travel in unison with the time lever.

The arm 62 extends through the casing 13 and is closely related to a scale marked in hours in advance of cut-off. The position of the arm 62 with respect to its scale thus indicates the number of hours necessary to heat the fluid located in the tank 32 up to the desired cut-off temperature. It is, therefore, apparent that when the arm 80, which indicates the number of hours of time in advance of the cut-off, and the arm 62, which indicates the number of hours necessary to raise the tank 32 to its predetermined cut-off temperature, are positioned at the same values on their respective scales, such arms 62 and 80 will be substantially in the same position, permitting their cooperating contacts 22 and 24 to become engaged, as hereinabove described. The engagement of contacts 22 and 24 then operates the relay 16, which connects the heating element 30 to the power supply 28, as shown in wiring diagram Fig. 3.

It is further obvious that the arms 80 and 62, after contacts 22 and 24 are engaged, will travel with substantially equal velocities up to the time of cut-off, when the contact 24 located on arm 80 will, due to the cooperation of cam 82 and arm 80, suddenly become disengaged from contact 22 and become engaged with contact 26, which in turn, deenergizes the relay 16 and disconnects the heating element 30 from the power supply. The arm 80, operatively associated with involute cam 82, at this time, due to the shape of the cam 82, drops back to the position marked 12 on the scale adjacent aperture 86, while arm 62 remains in an upper position in response to the increased water temperature, whereupon contact 24 becomes disengaged from contact 22 and engaged with contact 26, ensuring a permanent contact between contacts 24 and 26, which deenergizes the heating element 30, as hereinabove described.

It is to be understood that inasmuch as relay 16 is of the self-holding type, the contacts 22 and 24 need not be continuously engaged during the heating cycle. The contacts 22 and 24 need only be momentarily engaged in the proper time and temperature relation to start the heating action at the beginning of the heating cycle.

As the involute cam 82 continues to rotate due to the action of the time-of-day mechanism 14, the main portion of the cam 82 will, at the end of approximately 12 hours, again cause the arm 80 to be slowly moved upwardly, again indicating the number of hours before cut-off.

In some instances, it is advisable to limit the number of hours of operation of the heating element 30 or heating cycle irrespective of water temperature. This may be accomplished by locating an adjustably positioned pin 88 in line with the travel of temperature arm 62. The pin 88 may be rigidly attached to the casing 13 within a vertically extending slot 89, see Figs. 1, 2, 5, 6 and 9. The pin 88 will prevent the downward travel of arm 62 and will likewise prevent the travel of contact 22. Accordingly, the contact 24, operatively associated with time arm 80, must move up to the contact 22 before the heating element 30 can be operatively associated with the power supply 28. The position of pin 88 thus determines the earliest time at which the heater can first be connected to the power supply, regardless of the water temperature. However, when the time controlled arm 80 moves upwardly and the contacts 24 and 22 become engaged, it is apparent that arm 80 will likewise be positioned at the same location of arm 62 and that the control device, through the action of pin 88 will permit the heating element 30 to be operatively associated with the power device only this remaining predetermined adjustable length of time. It is, therefore, apparent that the position of pin or stop 88 will control the start of the off-peak period and will control the point below which the temperature arm 62 cannot recede.

A fundamental relationship exists between the predetermined temperature at the fixed hour at which the off-peak period terminates and the rate of heating of the fluid in degrees per hour, as is clearly shown in Fig. 7. The thermal control must be adjusted to conform to the tank heating rate, thereby establishing a critical temperature for each interval of time of the off-peak heating period. This critical temperature may be defined as that temperature which at a specific time interval in advance of cut-off will permit the tank to reach its exact predetermined temperature and cut-off time simultaneously. For example, if the tank is to be charged to a temperature of, say, 170° at 6 a. m. and is equipped with a water heater which will heat at the rate of 10° per hour, then its critical temperatures at corresponding times are as follows:

160° at 5 a. m.
150° at 4 a. m.
140° at 3 a. m., etc.

Then with the control mechanism adjusted properly to function on this critical temperature, the control mechanism will connect the heating element with the power supply just soon enough to recuperate or have the tank temperature at the predetermined value of 170° at cut-off, or in this instance, 6 a. m. This adjustment of the control is accomplished by the adjustable-rate thermostat 18 which may be set to correspond to the speed of heating of the particular tank with which the control mechanism is operatively associated and is indicated over the arbitrary 12-hour scale adjacent aperture 86 as degrees per hour, the degree per hour setting in this instance being chosen at between the limits of 5° per hour to 15° per hour, and is adjusted by the relative positioning of the link 60 and arcuate aperture 70 within arm 62.

In other words, with such chosen limits and the scale being limited between 0 and 12 hours, the scale marking will indicate degrees drop of water tank temperature of 60° to 180°. This value is arrived at by multiplying the degree per hour setting by the number of hours in advance of cut off, as shown on the scale adjacent aperture 86, or the lowest value 5° per hour times 12, or 60°, and 15° per hour times 12, or 180° for the full 12-hour time.

If then the thermostat 18 with its arm 62 registering on the same scale is adjusted so that its top temperature at zero setting on the scale is the desired top temperature of the liquid in the tank and the rate of temperature response of the arm 62 throughout the scale corresponds to the heating rate of the tank, the temperature of the thermostat is critical at the exact time corresponding to the time arm 80 when the two arms are adjacent. In other words, at this point the two contacts 22 and 24 will engage and cause the relay 16 to operate, connecting the heating element 30 to the power supply (see Figs. 3 and 4).

It is, therefore, obvious that my off-peak water heater thermostat performs a plurality of functions; namely, first, controls the earliest time at which the hot-water heater can turn on or be connected to the power supply, in this instance 11 p. m., or one hour later for each 10° the tank is hotter than the predetermined 100° at 11 p. m.; second, turns the water heater on at its critical temperature so that the heating of the tank will be completed simultaneously with the termination of the off-peak period, in this instance 6 a. m.; third, disconnects the water heater at the end of the off-peak period.

A second period of water heating may be obtained within the same 24-hour interval by the use of additional contacts 90, 92 and 94, and cams 96 and 98, as shown in Figs. 2, 4, 5 and 6. The cams 96 and 98 are rigidly attached to the driven shaft 48 and are of such configuration that they will cause the contacts 90, 92 and 94 to become operatively associated during, say, the early morning hours. The cam 96 first permits the contact 90 to engage contact 92, turning the water heater on or connecting the heating element 30 to the power supply 28 through contacts 24 and 26, as shown in Fig. 4, and preferably through a suitable thermostat (not shown) having the usual temperature-controlling function.

Then after the predetermined on period, cam 96 will permit contact 92 to engage contact 94 which, in turn, causes the relay 16 to disengage the heater 30 from the power supply.

It is to be understood that the second off-peak period may be timed at any hour during the day and that if desired, more than one of these additional off-peak periods may be utilized in conjunction with the control mechanism. However, it is to be understood that it is preferred that the additional off-peak control devices, such as cams 96 and 98, function only during the time in which the main elapsed-time device 20 and arm 80 remain stationary or when contacts 24 and 26 are engaged.

If it is desired to have a second time-temperature cycle, as hereinabove described, a second involute cam 83, substantially the same in design as cam 82 (see Figs. 10 and 13), may be attached to driven shaft 48 in juxtaposition to cam 82 and in cooperation with pin 84 on time arm 80. This second involute cam 83 would be used in the afternoon or at such other time as may be desired, to have additional heat supplied to the tank and when it may not be desired to have the tank returned to its predetermined maximum temperature value. However, it is to be understood that such second cam 83 may, if desired, be designed so as to return the tank to such maximum controlled temperature value.

The involute cam 83, see Fig. 13, has an involute portion 85 which is substantially the same shape as the corresponding portion of cam 82. Portion 80 is shorter than the corresponding portion of cam 82, as indicated by the dotted lines. Accordingly, the distance between the highest or end point and the center of rotation on the cam 83 is shorter than such distance to the highest point on cam 82. It is, therefore, obvious that, with the cam 83 attached to the shaft 48 and with pin 84 resting upon such cam, the pin 84 and time arm 80 would not be raised as high by the second cam 83 as by the original cam 82.

It, therefore, follows that by limiting the upward movement of time arm 80 and permitting such arm to return to its original position, in which contact 24 is engaged with contact 26, at an earlier point than when cam 82 controls such engagement, the maximum operating temperature of the heater for the second heating cycle will be correspondingly lowered.

By having the mounting aperture 97 in the second cam 83 slotted, say, along a radius substantially intermediate the point of original engagement with the time arm 80 and the highest or dropping off point, as illustrated in Fig. 13, such cam may be adjustably attached to the shaft 48 so as to vary the time of travel of such arm. With such a mounting, it is apparent that the highest or dropping off point of cam 83 may be adjustably positioned with respect to the driving shaft 48 and the time arm 80 so that the highest point of travel thereof and the correspondingly controlled maximum temperature of the tank may be adjusted to a predetermined value.

This method of attaching the cam to the shaft 48 adjustably controls the length of time of operation of the second time-temperature cycle and permits it to send the tank temperature to a predetermined value before being cut off.

The first involute cam 82 may have an arcuate slot 89 cut therein to permit a set screw 91 to be positioned therethrough and to be attached to the second cam 83. This structure then permits the second cam 83 to be rotated with respect to the first cam and thus to vary the time of operation of the second time-temperature cycle with respect to the first cycle. In other words, the second cam 83 may be adjusted to cut off any fixed number of hours following the first or standard cut-off. Suitable markings (not shown) may be placed upon cam 83 to permit ready adjustment thereof.

It is, therefore, obvious that, if desired, additional time-temperature cycles of operation of the fluid tank may be obtained by placing additional cams upon the driven shaft and in cooperation with the time arm, and that such cams may be adjustably positioned upon such shaft so as to adjustably vary the length of and the maximum temperatures obtained during such cycles.

Additional contacts 27 and 29 may suitably be attached to the casing 13 and operatively associated with the temperature arm 62 to function as a safety means for preventing the tank from overheating. The contacts 27 and 29 are in parallel with contacts 24 and 26 (see Figs. 11 and 12). Thus as the temperature arm 62 reaches its upper point of travel, and the tank has reached the predetermined maximum temperature value, the temperature arm 62 engages contacts 27 and 29, forcing them into an engaged position. The relay 16 will thus be operated so as to disconnect the heating element from the power supply, even though the time arm 80 is still traveling upwards or has not reached its cut-off point.

It is to be understood that the use of contacts 27 and 29 is merely for protective purposes and will in no way affect the operations of the hereinabove-described time-temperature cycles.

It is, therefore, obvious that an off-peak water heating control device embodying my invention will not only control the time at which the water heater will be connected to the power supply during the main off-peak period, but may control the times at which the water heater may be operatively associated with the power supply at other times during the day, and may also permit the water heater to be connected to the power supply at additional off-peak periods through the use of a second cam, or more than one additional cam.

Various further modifications may be made in the device embodying my invention without departing from the spirit and scope thereof, and I desire, therefore, that only such limitations shall be placed thereon as are imposed by the prior art and the appended claims.

I claim as my invention:

1. In a heating system, a medium to be heated, means for heating said medium, means for delivering power to said heating means, a supporting structure, a heat-responsive device including a bellows operatively associated with said medium and responsive to the temperature fluctuations thereof, a substantially constant-speed driving mechanism, a drive shaft associated therewith, an involute cam attached to said shaft, an arm rockably attached to said structure and moving in response to the movements of the cam only, a contact insulatedly attached to said arm, a second arm rockably attached to the structure and moving in response to the movements of the bellows, a contact insulatedly attached to the second arm and in line with said first contact, and means dependent upon predetermined movements of said arms and engagement of said contacts for controlling the delivery of power to said heating means.

2. In a heating system, a medium to be heated, means for heating said medium, means for delivering power to said heating means, a heat-responsive device operatively associated with said medium and responsive to the temperature fluctuations thereof, a substantially constant-speed driving mechanism, a plurality of cams operatively associated therewith, a second device responsive to the operations of said heat-responsive device, a third device responsive to operation of the driving mechanism and said cams, and means responsive to predetermined mutually dependent operations of said devices for controlling the delivery of power to said heating means in response to the movements of said cams at predetermined selected time periods and in response to the number of such cams for rendering said heating means effective at the latest time preceding the end of such periods that will be effective to raise the temperature of the medium to a predetermined value at the end of the periods.

3. In a fluid-heating system, a heater, means for delivering power to said heater, a device responsive to the temperature of the fluid, an elapsed-time device, said devices rotating in a common direction with an increase in the fluid temperature and the passage of time about a common axis during a preselected period of the day, and means dependent upon predetermined mutual action of said devices for controlling said power delivering means for rendering said heating means effective at the latest time preceding the end of such periods that will be effective to raise the temperature of the medium to a predetermined value at the end of said preselected period.

4. In a fluid-heating system, the combination with a container for the fluid, and controllable means for imparting heat to said fluid, of first means responsive to elapsed time, second means responsive to the temperature of said fluid for periodically rendering said heat imparting means ineffective for a predetermined period at a preselected time of day, and said first and second means independently rotating about a common axis in opposite directions, with a decrease in temperature of the fluid and the passage of time, during a predetermined time preceding the coacting of said first and second means with each other for rendering said heat-imparting means effective, said coaction of the first and second means occurring at the latest time preceding said preselected time of day that will be effective to raise the temperature of the fluid to a predetermined value at said preselected time.

5. In an off-peak type heater effective for heating tap water for residences during a period of each day when the demands for electrical energy and its cost to the consumer are reduced, the combination of a container for the water, means for heating the water in the container, means responsive to time for moving a control member starting at approximately the beginning of said reduced-cost period, means responsive to the temperature of the water to be heated for moving a second control member, said control members being adjacently mounted, and means rendered effective upon said control members occupying certain relative positions for energizing the heating means during the last portion of the reduced-cost period, the time of such energization increasing with increases in the requirements imposed upon the heater and vice versa.

6. In an off-peak type heater effective for heating tap water for residences during a period of each day when the demands for electrical energy and its cost to the consumer are reduced, the combination of a container for the water, means for heating the water in the container, means responsive to time for moving a control member starting at approximately the beginning of said reduced-cost period, means responsive to the temperature of the water to be heated for moving a second control member, said control members being coaxially mounted, and means rendered effective upon said control members occupying positions opposite each other for energizing the heating means during the last portion of the reduced-cost period, the time of such energization increasing with increases in the requirements imposed upon the heater and vice versa.

7. In an off-peak type heater effective for heating tap water for residences during a period of each day when the demands for electrical energy and its cost to the consumer are reduced, the combination of a container for the water, means for heating the water in the container, means responsive to time for moving a control member starting at approximately the beginning of said reduced-cost period, means responsive to the temperature of the water to be heated for moving a second control member, said control members being rotatable in opposite directions with the passage of time and with a decrease in water temperature, respectively, and means rendered effective upon said control members occupying positions opposite each other for energizing the heating means during the last portion of the reduced-cost period, the time of such energization increasing with increases in the requirements imposed upon the heater and vice versa.

8. In an off-peak type heater effective for heating tap water for residences during a period of each day when the demands for electrical energy and its cost to the consumer are reduced, the combination of a container for the water, means for heating the water in the container, means responsive to time for moving a control member starting at approximately the beginning of said reduced-cost period, means responsive to the temperature of the water to be heated for moving a second control member, a scale cooperating with the time-responsive control member to indicate the length of time prior to the end of said reduced-cost period, a scale cooperating with the temperature-responsive control member to indicate the length of time necessary to heat the water in the container up to a predetermined value, and means rendered effective upon said control members reaching the same point on their respective scales for energizing the heating means during the last portion of the reduced-cost period, the time of such energization increasing with increases in the requirements imposed upon the heater and vice versa.

EARL K. CLARK.